United States Patent Office 2,893,792
Patented July 7, 1959

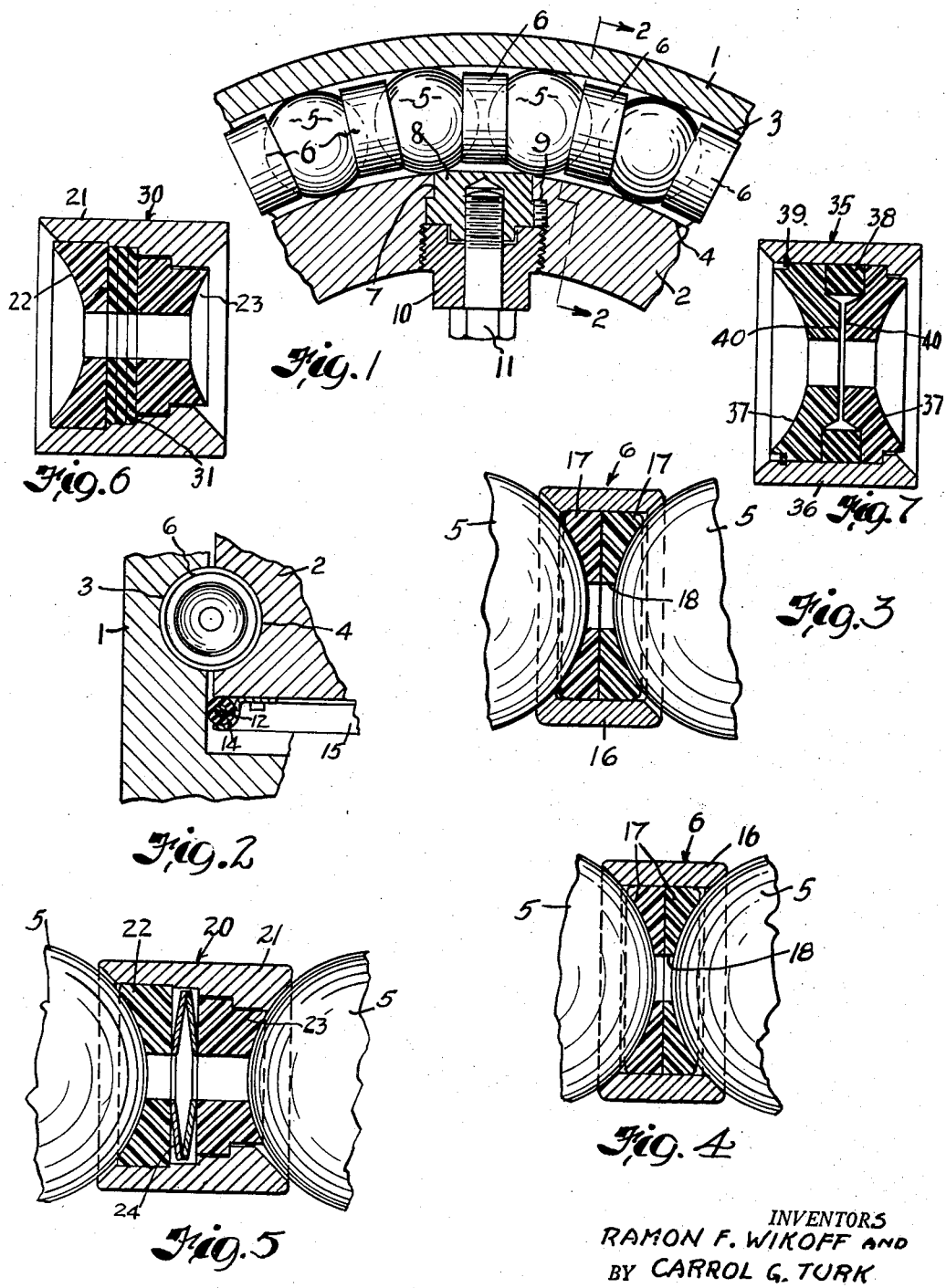

2,893,792

BALL BEARING

Ramon F. Wikoff, Amherst, and Carrol G. Turk, Elyria, Ohio, assignors to The Thew Shovel Company, Lorain, Ohio, a corporation of Ohio Application May 21, 1957, Serial No. 660,595

3 Claims. (Cl. 308—199)

The present invention relates, as indicated, to a ball bearing. More particularly, this invention has to do with a heavy-duty ball bearing which is especially adapted for use as, for example, in connection with the turntables of derricks, cranes, power shovels, exacavators, and like equipment. The present invention also relates to a novel form of ball spacer that is employed in such ball bearing.

In such ball bearing, the balls, as they pass through high load zones of the bearing, travel at differential speeds as compared with their normal speed whereby the balls are alternately crowded together and spread apart. Ball bearing manufacturers contend that the balls, as they successively enter the high load zones, tend to crowd together, and conversely, as they leave the high load zones, tend to move apart. It is for this reason that in a conventional ball bearing the ball separator is made to permit the balls to thus crowd together and to separate as they enter and leave the more heavily loaded zones. The conventional separator must also be designed to prevent oppositely moving surfaces of adjacent balls from coming into contact with each other because the rubbing velocity of ball surfaces is twice that of the velocity of the driven ball race. Also, rubbing pressures between the balls would be considerable since with the "full" type of ball bearing, the balls would have to force themselves from the unloaded zone into the loaded zone with pressures exerted at the ball equators or points of highest surface speed.

It is one principal object of this invention to provide a ball bearing and spacers therefor in which the latter, inserted between successive balls, each comprises an assembly having a resiliently deformable component mounted in a strong housing or carrier that serves to limit the degree of such resilient deformation well within the elastic limit thereof.

It is another object of this invention to provide a ball bearing having a novel form of seal associated therewith.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a fragmentary cross-section view of a portion of the present ball bearing, such section having been taken in a trans-axial plane through the middle of the bearing raceways;

Fig. 2 is a radial cross-section view of the bearing taken substantially along the line 2—2, Fig. 1;

Fig. 3 is a cross-section view showing one form of spacer that is interposed between successive balls;

Fig. 4 is a cross-section view of the Fig. 3 spacer except showing the adjacent balls crowded together to the maximum extent permitted by the housing or carrier of the resiliently deformable component of the spacer; and Figs. 5, 6, and 7 are cross-section views showing other forms of ball spacers in which the ball-contacting members are actuated by dish-shaped spring elements (Fig. 5) or by rubber-like elements (Figs. 6 and 7) disposed therebetween.

As shown in Figs. 1 and 2, the ball bearing herein shown for purpose of illustration comprises an outer bearing member 1 and an inner bearing member 2 that are formed with complemental raceways 3 and 4 in which a series of balls 5 are disposed with spacers 6 therebetween. The inner member 2 is shown here as being formed with an opening 7 through which the balls 5 and spacers 6 may be loaded into the bearing, such opening being closed as by means of a plug 8 held against rotation by the key screw 9 and locked in place through a bushing 10 and bolt 11 as best shown in Fig. 1.

The joint between the inner and outer bearing members 1 and 2 is sealed by means of a composite sealing ring which comprises an inner split ring 12 of metal which is formed to a diameter so as to exert outward pressure. If desired, the ring ends may be overlapped as in the case of a piston ring. Surrounding said ring 12 is an endless sleeve 14 of flexible plastic or like material which, in this case is pressed into sealing contact with the outer bearing member 1 under the expanding influence of the spring ring 12. A retaining ring 15 (or retaining clips) are attached to one of the bearing members (herein the inner bearing member 2) so as to hold the sealing ring in a position such that the sleeve 14 is in sealed engagement with said inner bearing member 2.

Referring now to the spacer 6, the same, as shown in Figs. 3 and 4, comprises a strong, metallic tubular housing 16 that is formed at its opposite ends with frusto-conical seats or with concave spherical seats matching the surfaces of the adjacent balls 5. Within said housing 16 is a resiliently deformable component 17, 17 likewise formed with concave spherical outer end faces for engagement with the respective balls 5 thereadjacent. Said component 17, 17 is formed with an opening 18 centrally therethrough which may serve as a reservoir for lubricant. Preferably, said component 17, 17 is made of nylon, polyethylene or like resiliently deformable material which is characterized by its relatively great strength and low coefficient of friction with the steel balls 5. Said component 17, 17 is dimensioned so that the adjacent balls 5 are yieldably held in predetermined spaced apart relationship uniformly around the raceways 3 and 4 but are capable of being resiliently crowded and separated as the balls 5 enter and leave the loaded zones of the bearing. The degree of resilient deformation of the component 17, 17 is limited by the engagement of the balls 5 with the end faces of the strong housing 16 (see Fig. 4). The resiliently deformable component cannot, therefore, be over-stressed nor can the balls ever come into rubbing contact with each other.

Said component 17, 17 may be made in two parts, as shown, so as to be separable for insertion of a spacing washer or the like therebetween to increase the extent of crowding of the balls 5, if such is found desirable in certain installations.

In the form of the spacer 20 illustrated in Fig. 5 there is again provided a strong, metallic tubular housing 21 which has fitted thereinto the resiliently deformable assembly. Here, such assembly comprises rings 22 and 23 of nylon or like material, formed with concave spherical end surfaces complemental with the adjacent balls 5 and between which is disposed a spring assembly including a pair of dished spring elements 24, 24 oppositely disposed with their peripheries in contact and with their central spaced apart portions in contact with the respective rings 22 and 23. Thus, under the influence of the crowding action of the balls 5, said dish-shaped spring elements 24, 24 are resiliently deformed to flat form between the rings 22 and 23, but such resilient deformation is limited by contact of the adjacent balls 5 within the frusto-conical or spherical seats of the housing or carrier member 21.

In the spacer 20, the ball-contacting member 23 is shown as being axially movably supported in housing 21 whereas the member 22 is shown as being press-fitted in said housing 21. Thus, resilient deformation of the spacer 20 is afforded by the spring elements 24 and by resilient member 22 and also by resilient member 23. The housing 20 serves in the same capacity as housing 16 in Figs. 3 and 4 to arrest deformation of the resiliently deformable component within its elastic limit.

In Fig. 6, the spacer 30 is essentially the same as spacer 20, utilizing a housing 21, and ball-contacting members 22 and 23, as of nylon or the like. The principal difference in spacer 30 from that in Fig. 5 is the use of one or more spring elements 31, herein, three being shown, interposed between the ball-contacting rings 22 and 23, said elements 31 being made of rubber-like material such as neoprene, for example, whereas in Fig. 5 the spring elements 24 are in the form of dished spring metal washers.

Referring now to Fig. 7, the spacer 35 comprises a strong, tubular housing 36 of metal formed with frusto-conical or spherical seats at its opposite ends, and a compound resiliently deformable element including a pair of ball-contacting members 37, 37 of nylon, for example, and an intervening ring 38 of rubber-like material such as neoprene.

The ball-contacting members 37, 37 and ring 38 are held in place as by a snap ring 39. Said members 37, 37 have portions 40, 40 which are held in spaced apart relation by the rubber-like ring 38 but which, after initial crowding together of the adjacent balls, are brought together into abutting relation whereupon further crowding together is resiliently resisted by the resilience of the nylon members 37, 37. Finally, before the ring 38 and members 37, 37 have been stressed to their elastic limits, the crowding together of the adjacent balls is arrested by the contact of the balls with the seats at the ends of the strong, rigid housing 36. Thus, with the spacers 35 it is possible to secure a two-stage resilient action of which the first stage may be a "soft" action to keep the balls 5 spaced apart when the bearing is under light loads and to permit slight crowding action as occurs under moderate loads and of which the second stage is a "harder" (or stiffer) action to accommodate greater extent of crowding of the balls 5 as may occur in a heavily loaded ball bearing.

The bosses 40 are beveled or relieved, as shown, to permit deformation of ring 38 without pinching between members 37, 37.

In the several forms of spacers 6, 20, 30, and 35 herein disclosed, chambers are formed therein from which lubricant is displaced due to the crowding action of the adjacent balls 5.

Other modes of applying the principle of the invention may be employed, change being made as regards the details described, provided the features stated in any of the following claims, or the equivalent of such, be employed.

We therefore particularly point out and distinctly claim as our invention:

1. In a ball bearing, the combination of resiliently deformable ball spacers interposed between successive balls for yieldable crowding together and yieldable spreading apart of the balls as they pass through loaded zones of the bearing, each spacer comprising a resiliently deformable component in contact between successive balls, a rigid tubular housing around said component having its ends spaced a predetermined distance from the respective balls and constituting a stop to arrest the extent of resilient deformation of said component under the influence of such crowding together of said balls, said component comprising a two-piece body of resiliently deformable material, and spring means operatively interposed between the pieces of said body to yieldably oppose such crowding action of the balls, the pieces of said body being brought together into abutting engagement during initial crowding action of the balls in opposition to the force exerted by said spring means and thereafter said pieces themselves being resiliently deformed as the balls are crowded to engage the ends of said housing.

2. A ball bearing spacer comprising a rigid tubular housing, a resiliently deformable component in said housing having ball seats at its ends which are located axially beyond the ends of said housing and which are adapted to yield toward each other under the influence of crowding action of balls engaged therewith, such yielding being arrested by contact of the balls with the ends of said housing, said component comprising opposed bodies of resiliently deformable material, spring means disposed between said bodies, and means operative to arrest yielding of said spring means after predetermined initial crowding action of the balls whereupon continued crowding action of the balls under greater resistance is accommodated by the resilient deformation of said bodies.

3. A ball bearing spacer comprising a rigid circumferentially continuous tubular housing formed with coaxial annular concave ball seats at its ends, and a resiliently deformable component in said housing also having coaxial annular concave ball seats at its ends which are located concentrically within and axially beyond the seats of said housing and which are adapted to yieldably oppose crowding movement of balls engaged therewith, the ball seats at the ends of said housing constituting stops engaged by the adjacent balls upon predetermined crowding action thereof to arrest the extent of deformation of said component.

References Cited in the file of this patent

UNITED STATES PATENTS

| | | |
|---|---|---|
| 824,820 | Riebe | July 3, 1906 |
| 860,186 | Beemer | July 16, 1907 |
| 950,919 | Hess | Mar. 1, 1910 |
| 1,015,441 | Hess | Jan. 23, 1912 |
| 1,209,537 | Atkins | Dec. 19, 1916 |
| 2,432,717 | Berger | Dec. 16, 1947 |
| 2,661,967 | Mitchell | Dec. 8, 1953 |
| 2,689,144 | Uhrig et al. | Sept. 14, 1954 |
| 2,827,345 | Zeilman | Mar. 18, 1958 |